April 14, 1936.   E. BOECKING   2,037,453
FILM GATE
Filed March 8, 1934
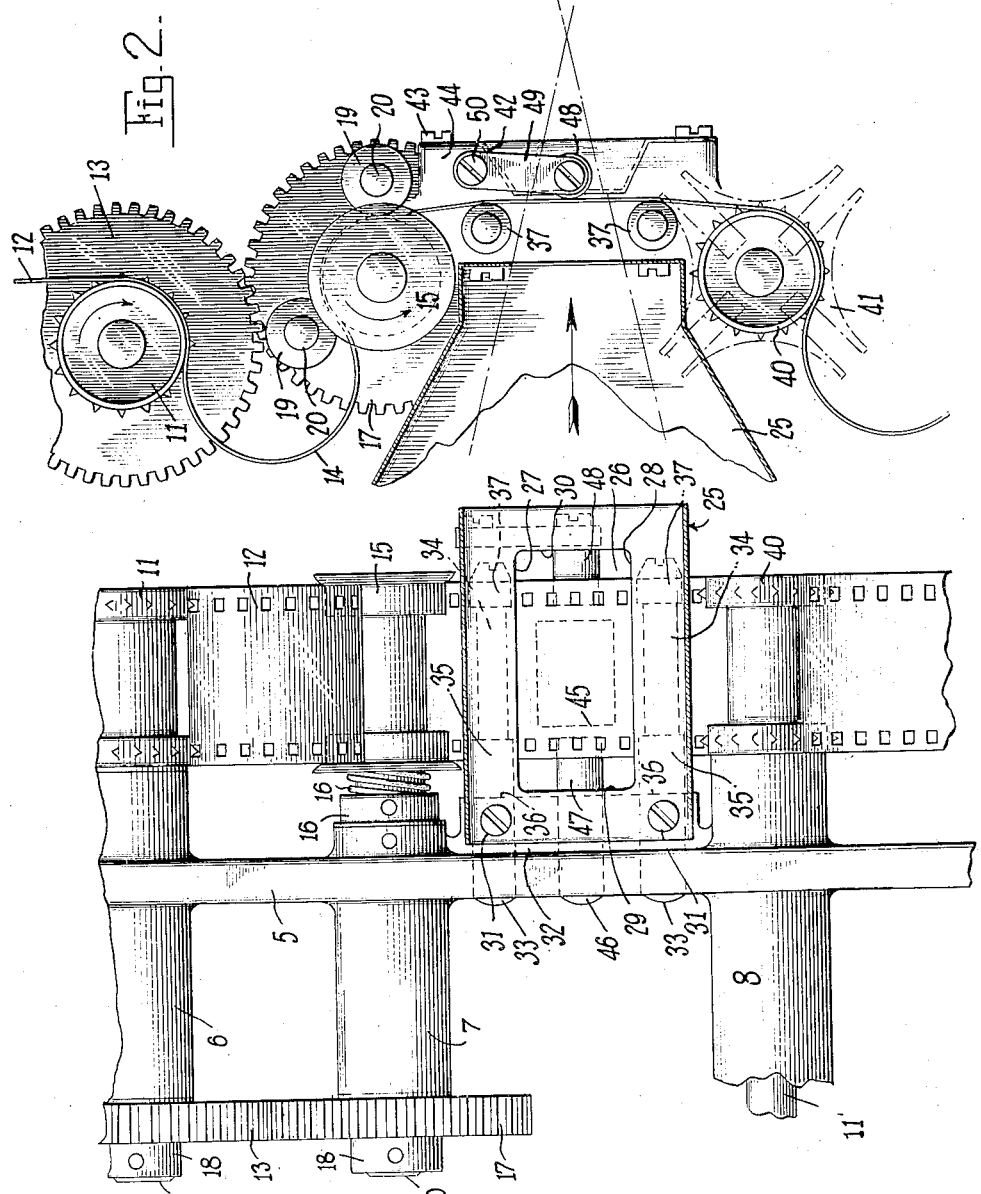
INVENTOR
Ewald Boecking
BY
Austin + Dix
ATTORNEY Patented Apr. 14, 1936

2,037,453

UNITED STATES PATENT OFFICE 2,037,453

FILM GATE

Ewald Boecking, Brooklyn, N. Y., assignor to International Projector Corporation, New York, N. Y., a corporation of Delaware Application March 8, 1934, Serial No. 714,570

2 Claims. (Cl. 88—17)

This invention relates to motion picture projection machines and more particularly to a novel and improved construction of the portions of such a machine which cooperate with the film in the zone where the projecting light strikes it. More particularly the invention pertains to an improved gate in a motion picture projection machine.

In modern practice the lamps which are employed in projecting machines for large theatres are very powerful and the film is thus subjected to intense heat as each individual view on the film is momentarily stopped in front of the lamp. The present invention pertains to an observation that this intense heat is probably the primary cause of buckling of the film in front of the gate. This buckling is believed to be due to the fact that heretofore only the picture areas of the film have been subjected to the light rays and not the whole width of the film. That is to say, the edges of the film, containing the sprocket holes, have not been heated to the same extent as the center of the film, containing the pictures, with the result that the film buckles or bulges and an untrue projection of the picture is produced on the screen.

An object of the present invention is, accordingly, to provide a new and improved construction which avoids these disadvantages.

More particularly, a feature of the invention resides in providing a practical construction, adapted for motion picture projecting machines, in which construction the film is subjected to the light across its entire width, while provision is made for an aperture plate to control the beam of light to the proper size for projecting the pictures from the film onto the screen.

Another feature of the invention resides in the provision of a novel and improved type of film gate for guiding and aligning a film in the zone of the projection light beam, while minimizing the friction between the film and the gate.

Additional features reside in certain novel combinations of parts in constructions which are simple and inexpensive to manufacture, efficient in operation and durable in service.

Other features, objects and advantages will be in part apparent and in part pointed out in connection with the following detailed description of one form of the invention, reference being had to the accompanying drawing wherein:

Fig. 1 is a rear elevation, partly broken away, of an improved film gate and aperture construction and of certain portions of film feeding mechanism embodying the invention; and Fig. 2 is a side elevation, partly in section and partly broken away, of the construction shown in Fig. 1.

Referring to the drawing, a rigid frame member 5, forming part of the head of the projection machine, carries journals 6, 7 and 8 for receiving shafts 9, 10 and 11 respectively. The journals may be formed integral with the member 5, if desired. Secured to the forward end of shaft 9 is a feed or take-off sprocket 11 which, when rotated in the direction of the arrow on it (Fig. 2), draws film 12 from a take-off reel (not shown). Keyed or otherwise secured to the rear end of shaft 9 is a gear 13 which may be driven from any suitable source of power, such as an electric motor, through convenient connections (not shown).

Passing from the sprocket 11, the film is threaded so that it forms an upper loop, 14, and thence passes over a flanged friction and guide device 15 keyed or otherwise secured for rotation with and for sliding along shaft 10. A spring 16 bears against a collar 16', pinned to the shaft, and urges the device 15 toward the right in Fig. 1, against a suitable stop (not shown). If desired, the device 15 may be axially adjustable by means of suitable stops for edge guiding the film, for instance, as described in my copending application Serial No. 714,571, filed March 8, 1934 to which reference is made for details. The shaft 10 may be driven at the same speed as shaft 9, but in the opposite direction, by gear 17 secured to the rear end of shaft 10. Suitable collars 18 may be secured to shafts 9 and 10 to prevent end play and maintain the gears in abutment with the rear faces of journals 6 and 7.

The friction roller 15 thus places a positive drag on the film in advance of the gate and takes slack out of it, while properly aligning it for passage through the gate. A pair of presser rollers 19 are provided journaled on shafts 20, for maintaining the film in engagement with roller 15, and shafts 20 are preferably constructed so as to be movable away from the roller 15, in any convenient or known manner to permit ready threading of the film. If desired shoes of suitable or known form may replace the rollers 19. If desired the roller 15 may be stationary instead of being driven. In itself, it forms no part of the present invention, being described and claimed elsewhere.

Below the roller 15 there may be provided a box-shaped light directing device 25, provided with a central opening 26 which is of such shape and size as to permit a beam of light, aimed in the direction of the large arrow in Fig. 2, to flood substantially the full area of the section of the film which is momentarily stopped, by mechanism hereafter described, for projection. More specifically, the upper edge 27 and lower edge 28 of the opening 26 may advantageously lie so that the beam of light permitted to pass between them, as indicated by dot and dash lines (Fig. 2), will strike the film over substantially the entire area of a film section including a single picture. Where the film includes portions which space the actual pictures apart, as is customary, then the light is advantageously controlled so that it strikes about half of each of said portions adjacent upper and lower edges of the actual picture. The side edges 29, 30 of the opening 26 should be far enough apart to permit the light to strike the film across its entire width.

The device 25 may be rigidly mounted as by being secured by bolts 31 to a flange 32 formed integral with frame member 5.

In front of the flange 32 there may be mounted in member 5 a pair of laterally extending pins 33 in which may be journaled, in any convenient manner, rollers 34 having enlarged portions 35, bearing against the ends of pins 33 as at 36, and also having enlarged portions 37 adjacent their forward ends. The portions 35 and 37 may be secured to the rollers 34 in any suitable manner, and are preferably of such extent as to engage only the marginal areas of the film, outside of the inner edges of the sprocket holes at either side of the film, so that they do not touch the actual pictures or sound records of the film. The rollers may lie in back of the film, preferably above and below the path of the light, as shown in Fig. 2.

The film is preferably drawn or pulled over the rollers 34 by a film sprocket 40 secured to shaft 11, which is operated by intermittent mechanism of known character, for instance through a Geneva gearing, the star wheel of which is shown at 41 in Fig. 2. The star wheel may be operatively connected to shaft 11 at any convenient point.

In front of the film, there is mounted an aperture plate 42, which may be bolted as at 43, to any convenient rigid portion 44 of the frame. The aperture in the plate is indicated in dotted lines, at 45 (Fig. 1), and is preferably such as to accurately control the light passing through the film to exact size of the picture. Where the aperture is slightly spaced from the film and in front of it, as is preferable for purposes hereafter described, the size of the aperture should be proportionately smaller than the area of the picture on the film, so that only the light required for the projection of the picture will pass the aperture. When the film includes a sound track, the aperture will be properly proportioned and positioned to accommodate the reduced size picture, as will be apparent to those skilled in the art.

In order to avoid having the film frictionally drag against the aperture plate, and at the same time obviate a bulge in the film in front of the opening 26 and between the rollers, 34, there may be provided a pin 46 or another suitable device, mounted similarly to pins 33, and having journaled thereon a roller or stud 47 for engaging a margin of the film on its front surface, and there may also be provided a roller or stud 48 for engaging the opposite margin of the film. Roller 48 may be pivoted on a depending arm 49 secured as at 50 to frame portion 44. During operation of the machine, the rollers 47 and 48 are preferably horizontally aligned and adapted to maintain the film substantially in a straight line between rollers 34, and out of contact with the aperture plate, which is preferably, however, closely adjacent the film for insuring accuracy in projection. If desired, the arm 49 may be adapted to be swung clear of the film during threading of the film through the machine. However, the invention in its broader aspects is not limited to any particular film guiding devices, and it will be appreciated that various structural modifications may be made within the spirit of the invention.

It will thus be understood that as the film is repeatedly stopped in front of the opening 26, the light strikes the film section over its entire area and the heat is substantially uniformly distributed over the entire section, thus avoiding heating only the center or picture containing area of the film while leaving the marginal areas practically unheated. Through the present construction buckling is thus largely avoided as there is no great differential of the heat hitting the film. Moreover, provision is made for holding the surface of the film substantially flat across the face of the aperture, and at the same time for avoiding undue friction as the film is passed through the machine. Altogether, there will result a superior projection of the pictures, while at the same time there is obviated the necessity for complicated mechanism for moving the film gate while the film is being threaded as has been the practice in the past.

While the invention has been described as developed for motion picture projectors, certain features may be advantageous in other connections, and there is no intention of excluding such use from the scope of the invention.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

Certain features disclosed herein are claimed in my copending application Serial No. 714,572, filed March 8, 1934, and hence are not claimed specifically in this application.

What is claimed is:

1. In that part of a motion picture apparatus which guides the film in its passage in front of the projector light, the combination of a plate having an aperture therein of a size to give the desired size of picture on the screen, said plate being mounted in front of the film in the projection zone, a pair of devices for engaging the rear face of the film adjacent opposite edges thereof at points above and below the aperture, the film being free of engagement on its rear face between said points, whereby the beam of light may strike the rear surface of the film across the full width thereof and across the full height of the section under projection, and elements mounted to engage the front face of the film at both edges thereof and at points substantially midway between said points at the rear of the film, and at either side of said aperture, whereby a three-point contact is provided at either edge of the film while enabling the light beam to strike the entire film section under exposure.

2. In that part of a motion picture apparatus which guides the film in its passage in front of the projection light, the combination of a plate having an aperture therein of size to give the desired size of picture on the screen, two rollers mounted on opposite sides of said aperture plate and adapted to engage the front edges of a film passing in front of said aperture plate, four rollers mounted to the rear of said first two rollers for engaging the edges of the film at the rear surface of said film, two of said rollers being adapted to engage the same edge and being spaced apart so that the roller bearing against the front edge of the film will be positioned between said two rollers and will hold the film taut, the other two rear rollers engaging the other rear edge of the film and cooperating with the other front rollers in like respect and adapted to assist in holding the film taut, and a light device mounted between the film and the source of light, said device having an aperture therein for permitting the light to strike the film, said aperture having sufficient width to have the full width of the film in the light rays.

EWALD BOECKING.